Patented Nov. 27, 1945

2,389,959

UNITED STATES PATENT OFFICE 2,389,959

PLASTICIZED COMPOSITIONS

Russell T. Dean, Stamford, Conn., assignor to American Cyanamid Company, New York, N. Y., a corporation of Maine No Drawing. Application September 26, 1942, Serial No. 459,822

8 Claims. (Cl. 260—36)

This invention relates to the softening or plasticizing of natural and synthetic rubber-like compositions suitable for various applications.

In the use of various available compounds for the production of synthetic rubber-like materials, it has been found necessary to employ various plasticizers and softening agents. Many of these plasticizers are costly materials and are difficult to incorporate by milling into the compositions. In addition, some of these plasticizers require a more or less extended aging period for the development of maximum plasticity. Furthermore, certain of the plasticizers which are used for assisting in the milling operations must be removed before the final curing of the rubber composition.

It is an object of the present invention to provide a new class of plasticizers for rubbery materials, which plasticizers are effective elasticators while, at the same time, they avoid the principal objections to the plasticizers previously available.

These and other objects are attained by using as plasticizers for the natural and synthetic rubbers β-alkoxy and β-aryloxy propionic acid esters having the following structural formula:

R—OCH$_2$CH$_2$COOR' in which R' is an alkyl or alkoxyalkyl radical and R is the same or a different alkyl or alkoxyalkyl radical or a cycloalkyl, aralkyl, aryl, alkaryl, aralkoxyalkyl or heterocyclic radical, e. g., n-hexyl, cyclohexyl, benzyloxyethyl, ethoxyethyl, butyl, amyl, 2-ethyl hexyl, tetrahydrofurfuryl, benzyl, ethoxyethoxyethyl, butoxyethoxyethyl, phenyl, o-methyl phenyl, m-methyl phenyl, p-methyl phenyl, tolyl, o-ter-amyl phenyl, o-chlorophenyl and p-chlorophenyl.

The following are illustrative of the plasticizing compounds embraced in the present invention:

Butyl β-n-hexoxy propionate
Butyl β-cyclohexoxy propionate
Butyl β-benzyloxy propionate
Butyl β-tetrahydrofurfuryloxy propionate
Butyl β-benzyloxyethoxy propionate
Butyl β-ethoxyethoxyethoxy propionate
Butyl β-butoxyethoxyethoxy propionate
Butyl β-phenoxy propionate
Butyl β-o-methylphenoxy propionate
Butyl β-m-methylphenoxy propionate
Butyl β-p-methylphenoxy propionate
Butyl β-o-chlorophenoxy propionate
Butyl β-p-chlorophenoxy propionate
Butyl β-o-ter-amylphenoxy propionate
Butyl β-tolyloxy propionate
2-Ethyl hexyl β-phenoxy propionate
2-Butoxyethyl β-2-butoxyethoxy propionate
n-Hexyl β-phenoxy propionate.

These and similar compounds falling within the scope of the present invention may be made by any suitable method. It has been found that a simple method for their preparation comprises reaction of the corresponding nitrile and alcohol in the presence of a molecular proportion of sulfuric acid, the esterification reaction being carried out at about 110–120° C. in accordance with known procedures. The desired nitriles are conveniently prepared by the condensation of acrylonitrile with the desired alcohol or phenol.

The plasticizers of the present invention are, as indicated, especially effective when used in the production of rubber-like compositions. Such synthetic rubber-like compositions include those prepared from vinyl chloride polymers, chloroprene polymers, polymerized diolefins and copolymers of diolefins and olefins, isobutene polymers, organic polysulfides and the various copolymer types of synthetic rubbers including polyacrylyl or polyvinyl compounds such as butadiene 1,3 and acrylonitrile copolymers or butadiene 1,3 and styrene copolymers, and the like. The incorporation of the plasticizer with the rubber-like material may be carried out in accordance with the usual practice, during the milling or breaking-down period, e. g., on the mill rolls. The amount of the softening agent used may be varied widely and in general will be governed by the particular softening agent selected, the degree of toughness of the synthetic rubber-like mass, the extent to which softening of the latter is desired, and the other properties which it is desired to impart to the rubber-like composition. In general, the amount may be from about 5% or less to about 50% based on the weight of the synthetic rubber-like material.

As illustrative of suitable methods for incorporating the plasticizers of the present invention into the various compositions, the following examples are given without restricting the invention thereto.

EXAMPLE 1

One hundred parts by volume of polyvinyl chloride were mixed in a suitable container with 89 parts by volume of the selected plasticizer. This mixture was gradually fed onto a 6" x 12" open mill, the rolls of which were set tightly together and which were maintained at a temperature of about 150° C. The mixture, after having been passed once through the rolls, was in the form of a flaky product and was returned to the tightly-set rolls until a continuous sheet began to form. The period of time required to form this sheet was noted as the sheeting time. The milling of the product was continued with gradual opening of the rolls to allow the mixture to build up a rolling bank of about ¼" diameter. Without additional adjustment of the rolls, the milling was continued until a reasonably translucent sheet of plasticized polyvinyl chloride was obtained and the sheet was removed from the rolls. The total milling period required was noted as the "milling time" and it is desirable that this period of time be as short as possible, for the obvious purpose of economical operation.

The sheet removed from the roll was cooled and the cooled sheet molded in a suitable press for 20 minutes at 160° C. Samples were cut from the molded sheet and these samples were subjected to a series of tests as indicated in the following table in which, for comparative purposes, dibutyl phthalate is set forth as a standard.

*Table 1*

|  | Milling time | Actual solvent loss, percent | Heat loss | Brittle point |
|---|---|---|---|---|
|  |  |  |  | °C. |
| Butyl β-cyclohexoxy propionate | 6½ | 18.8 | 28.0 | −60 |
| Butyl β-tetrahydrofurfuryloxy propionate | 6½ | 24.3 | 33.9 | −60 |
| Butyl β-benzyloxyethoxy propionate | 6½ | 23.4 | 34.3 | Below −46 |
| Butyl β-ethoxyethoxyethoxy propionate | 7½ | 34.6 | 32.0 | Below −57 |
| Butyl β-butoxyethoxyethoxy propionate | 8½ | 22.9 | 32.5 | Below −57 |
| Butyl β-phenoxy propionate | 6½ | 23.5 | 34.2 | Below −40 |
| Butyl β-o-methylphenoxy propionate | 6½ | 23.9 | 33.2 | −55 |
| Butyl β-m-methylphenoxy propionate | 6½ | 25.2 | 35.4 | −60 |
| Butyl β-p-methylphenoxy propionate | 6½ | 25.0 | 34.7 | −55 |
| Butyl β-p-chlorophenoxy propionate | 6½ | 25.8 | 36.5 | −50 |
| Butyl β-o-ter-amylphenoxy propionate | 10 | 21.6 | 28.6 | −50 |
| Butyl β-tolyloxy propionate | 6½ | 23.6 | 33.2 | −55 |
| 2-ethyl hexyl β-phenoxy propionate | 8 | 22.6 | 31.4 | Below −57 |
| n-Hexyl β-phenoxy propionate | 6½ | 26.3 | 35.6 | −65 |
| Dibutyl phthalate | 6½ | 23.1 | 31.7 | −45 |

The solvent loss indicated in the table is the percent loss in weight of a sample which was soaked in 70° gasoline for 14 days and dried for 16 hours at 65° C.

The heat loss in the table represents the percentage loss in weight of a sample after being heated for 14 days in an oven at 100° C.

The brittle point given in the table represents that temperature at which a sample broke when bent through a 90° angle.

Since dibutyl phthalate is considered a good plasticizer for polyvinyl chloride, those plasticizers which show characteristics at least as good or superior to dibutyl phthalate are valuable for this purpose. Where the plasticizers show lower solvent loss and/or lower heat loss than dibutyl phthalate, they are superior for many uses or applications. So far as the other physical properties such as elongation, tensile strength and the like, are concerned, the plasticizers of the present invention give substantially the same or superior results in comparison with those obtained with dibutyl phthalate.

EXAMPLE 2

These plasticizers are also effective with other synthetic rubber-like materials, e. g., Hycar (butadiene 1, 3-acrylonitrile copolymers). In these tests, 250 parts by weight of Hycar was mixed with 125 parts by weight of the plasticizer by milling the mixture on suitable rolls at 50° C. The time required to incorporate the plasticizer was recorded as the incorporation time. The several samples of plasticized Hycar were compounded in accordance with the following formula:

|  | Parts by weight |
|---|---|
| Hycar } previously mixed | 100 |
| Plasticizer } | 50 |
| Channel black | 50 |
| Zinc oxide | 5 |
| Sulfur | 1.5 |
| Stearic acid | 1 |
| Phenyl-β-naphthylamine | 1 |
| Benzothiazyl disulfide | .95 |
| Zinc chloride—DOTG reaction product | .20 |

After formulation, each batch was allowed to cool overnight and was then remilled and cooled for about 4 hours. These products were then cured in the form of sheets by heating for 30 minutes at a temperature of 153° C. The results obtained are contained in the following table.

*Table 2*

|  | Incorporation time | Apparent solvent loss, percent | Impact resilience | Heat loss | Brittle point |
|---|---|---|---|---|---|
|  |  |  |  |  | °C. |
| Butyl β-benzyloxy propionate | 14 | 9.2 | 64 | 23.0 | Below −46 |
| Butyl β-ethoxyethoxy propionate | 15 | 9.9 | 64 | 22.9 | Below −46 |
| Butyl β-butoxyethoxyethoxy propionate | 20 | 9.5 | 62 | 25.7 | Below −46 |
| Butyl β-phenoxy propionate | 15 | 8.1 | 57 | 22.8 | Below −46 |
| 2-ethyl hexyl β-phenoxy propionate | 13 | 4.2 | 50 | 25.2 | Below −46 |
| 2-butoxyethyl β-2-butoxyethoxy propionate | 24½ | 8.5 | 60 | 24.2 | Below −46 |
| Dibutyl phthalate | 16 | 3.4 | 47 | 25.3 | −45 |

The apparent solvent loss represents the percentage change in weight of a sample after soaking for 48 hours in hexane and wiping the sample.

The heat loss represents the percentage loss in weight after heating for 48 hours in an oven at 150° C.

The brittle point is the temperature at which the sample broke on being bent through an angle of 90°.

The impact resilience is the reading indicated by the Shore scleroscope, the higher the reading the more resilient the stock, thus indicating that the plasticizer is a better elasticator.

The plasticizers giving lower solvent loss, lower heat loss, lower brittle points and/or higher resilience than dibutyl phthalate are generally more desirable plasticizers, especially for such purposes as require superior properties in these respects. The other physical characteristics of the cured stock, such as plasticity ("Y" values), tensile strength, elongation, etc. are generally as good as, or superior to, the same properties obtained when dibutyl phthalate is used.

Mixtures of a natural rubber with one or more of the synthetic rubber-like materials of the kind referred to may also be obtained in a softened condition by the use of one or more of the plasticizers of the present invention. Furthermore, natural rubbers may, themselves, be plasticized by milling them with a relatively small amount of one of the present plasticizers, about 1-10% on the weight of the rubber being sufficient in most cases.

Where it is desired to obtain mixtures of two or more of the synthetic rubber-like materials described, either with each other or with a natural rubber, such mixtures are preferably prepared by first milling the tougher of the materials with one of the plasticizing agents so as to bring the same to a condition of softness approximating that of the softer component or components. Additional plasticizers may be added as milling is continued.

The quantity of plasticizers may be varied as well as the temperature and the length of time of mixing. In general, these interrelated factors will be governed by the efficiency of the plasticizer selected as well as by the nature of the natural or synthetic rubber-like materials. The rate of incorporation of the plasticizers may be increased by raising the mixing temperature although it would obviously be undesirable to use such temperature as would have harmful effects on the ingredients of the mixture. Likewise, the size of the batches mixed will affect the mixing time. The plasticized rubber-like compositions prepared in accordance with the present invention may be used wherever compositions of similar character are now employed. Thus, these compositions may be used in the waterproofing of fabrics as well as in the production of calendered, extruded or molded articles. The compositions may include various fillers, pigments, dyes, or the like.

In the plasticizers of the present invention the alkyl group represented by R in the generic formula may also be a heterocyclic group, for example the tetrahydrofurfuryl radical. While the alkyl groups may be those of the lower boiling alcohols such as methyl and ethyl, such esters may be too volatile for some purposes. For the purpose of producing best plasticizers, it is generally preferable that the alkyl groups contain carbon to carbon chains not exceeding six carbon atoms in length.

Other suitable changes and modifications may be made in the invention without departing from the spirit and scope thereof, as defined in the appended claims.

I claim:

1. The process of plasticizing and softening butadiene 1,3-acrylonitrile copolymer synthetic rubber-like materials which comprises admixing with such materials a β-substituted oxypropionic acid ester having the following structural formula

R—OCH₂CH₂COOR' in which R' is a member of the group consisting of the alkyl and alkoxyalkyl radicals and R is a member of the group consisting of the alkyl, alkoxyalkyl, cycloalkyl, aryl, aralkyl, aralkoxyalkyl and tetrahydrofurfuryl radicals.

2. The process of plasticizing and softening butadiene 1,3-acrylonitrile copolymer synthetic rubber-like materials which comprises admixing with such materials butyl β-phenoxy propionate.

3. The process of plasticizing and softening butadiene 1,3-acrylonitrile copolymer synthetic rubber-like materials which comprises admixing with such materials butyl β-cyclohexoxy propionate.

4. The process of plasticizing and softening butadiene 1,3-acrylonitrile copolymer synthetic rubber-like materials which comprises admixing with such materials n-hexyl β-phenoxy propionate.

5. A composition comprising butadiene 1,3-acrylonitrile copolymer synthetic rubber-like materials, plasticized with a β-substituted oxypropionic acid ester having the following structural formula:

R—OCH₂CH₂COOR' in which R' is a member of the group consisting of the alkyl and alkoxyalkyl radicals and R is a member of the group consisting of the alkyl, alkoxyalkyl, cycloalkyl, aryl, aralkyl, aralkoxyalkyl and tetrahydrofurfuryl radicals.

6. A composition comprising butadiene 1,3-acrylonitrile copolymer synthetic rubber-like materials, plasticized with butyl β-phenoxy propionate.

7. A composition comprising butadiene 1,3-acrylonitrile copolymer synthetic rubber-like materials, plasticized with butyl β-cyclohexoxy propionate.

8. A composition comprising butadiene 1,3-acrylonitrile copolymer synthetic rubber-like materials, plasticized with n-hexyl β-phenoxy propionate.

RUSSELL T. DEAN.